(12) United States Patent
Jones et al.

(10) Patent No.: US 12,103,893 B2
(45) Date of Patent: Oct. 1, 2024

(54) LONG STRAND FIBERGLASS-IMPREGNATED WATERPROOFING COMPOUND

(71) Applicants: Michael Jones, Rancho Cucamonga, CA (US); Gregory Jones, Rancho Cucamonga, CA (US)

(72) Inventors: Michael Jones, Rancho Cucamonga, CA (US); Gregory Jones, Rancho Cucamonga, CA (US)

( * ) Notice: Subject to any disclaimer, the term of this patent is extended or adjusted under 35 U.S.C. 154(b) by 729 days.

(21) Appl. No.: 17/073,082

(22) Filed: Oct. 16, 2020

(65) Prior Publication Data

US 2022/0119308 A1 Apr. 21, 2022

(51) Int. Cl.
| | |
|---|---|
| *C04B 14/42* | (2006.01) |
| *C04B 14/34* | (2006.01) |
| *C04B 24/24* | (2006.01) |
| *C04B 26/26* | (2006.01) |
| *C04B 28/00* | (2006.01) |
| *C04B 111/27* | (2006.01) |

(52) U.S. Cl.
CPC ............. *C04B 14/42* (2013.01); *C04B 14/34* (2013.01); *C04B 24/24* (2013.01); *C04B 26/26* (2013.01); *C04B 28/001* (2013.01); *C04B 2111/27* (2013.01)

(58) Field of Classification Search
CPC ..... C04B 14/42; C04B 24/24; C04B 2111/27; C04B 26/26; C04B 28/001; C04B 14/34
See application file for complete search history.

(56) References Cited

U.S. PATENT DOCUMENTS

2018/0010317 A1* 1/2018 Walker ................... E02D 19/06

* cited by examiner

*Primary Examiner* — Robert D Harlan
(74) *Attorney, Agent, or Firm* — Pharar Patents & Intellectual Property; Andrew A. Pharar

(57) ABSTRACT

The long strand fiberglass-impregnated waterproofing compound may provide a pre-mixed waterproofing compound that eliminates the need for a worker to combine the various elements prior to application. The compound may benefit from the use of long strand fiberglass so as to provide additional strength and resiliency to the compound and may be provided in a container suitable for preventing the compound from drying out before it is applied. The advantages of such a compound include creating a seamless waterproof seal on a surface, as well as adding structural rigidity and strength to the surface, while reducing the amount of time needed to apply the compound. The compound comprises, generally, a waterproofing material combined with a structural lattice in a portable container.

8 Claims, 4 Drawing Sheets

LONG STRAND FIBERGLASS-IMPREGNATED WATERPROOFING COMPOUND

TECHNICAL FIELD OF THE INVENTION

The present invention relates in general to waterproofing materials, and, more specifically, to a long strand fiberglass-impregnated waterproofing compound.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Waterproofing is the technique by which a structure or object is covered in a layer of material that prevents fluid intrusion into the structure or object. Originally, objects were waterproofed by applying a layer of tar or asphalt to the outer surface of the object and allowing it to dry, thus creating a seamless outer layer. More modernly, objects may be waterproofed by applying hydrophobic coatings or by sealing with gaskets. In the construction industry, specifically, buildings may be waterproofed by applying tar or asphalt compositions to an outer surface, often with the tar or asphalt being combined with a structural lattice for providing added strength to the layer.

It is known in the construction industry to apply an asphalt layer to a roof, for example, by combining the asphalt with fiberglass strands on the site, and then either rolling or spraying the material combination onto the roof and allowing it to dry and harden. Such a combination provides an effective layer of waterproofing that also provides additional structural strength to the roof.

U.S. Pat. Nos. 5,462,764 and 5,468,293, for example, provide a sprayer device that may combine fiberglass strands and asphalt into an emulsion that may be applied directly to the roof surface. Some such devices are able to cut the fiberglass during the spraying action, and may be able to vary the length of the fiberglass strands as desired. As disclosed in these two patents, it is advantageous to use longer fiberglass strands, up to approximately 24 inches in length, because the lattice structure created by these longer strands is stronger and more resilient than the structure created by shorter strands.

The primary issue with using such compounds in the industry is that the components of the compound must be delivered to the work site and then combined prior to or during the application stage. For example, a worker may be required to prepare the asphalt, mix in the fiberglass, and then apply the combination to a roof surface. Automated sprayers, like those described above, may simplify the process by automatically combining the various materials required, though they still require a worker to load the sprayer with the distinct components.

Thus, there is a need in the art for a long strand fiberglass-impregnated waterproofing compound that may provide a pre-mixed waterproofing compound that eliminates the need for a worker to combine the various elements prior to application. The compound may benefit from the use of long strand fiberglass so as to provide additional strength and resiliency to the compound and may be provided in a container suitable for preventing the compound from drying out before it is applied. It is to these ends that the present invention has been developed.

BRIEF SUMMARY OF THE INVENTION

To minimize the limitations in the prior art, and to minimize other limitations that will be apparent upon reading and understanding the present specification, the present invention describes a long strand fiberglass-impregnated waterproofing compound.

It is an objective of the present invention to provide a long strand fiberglass-impregnated waterproofing compound that may comprise a waterproofing material.

It is another objective of the present invention to provide a long strand fiberglass-impregnated waterproofing compound that may comprise an asphalt.

It is another objective of the present invention to provide a long strand fiberglass-impregnated waterproofing compound that may comprise a concrete.

It is another objective of the present invention to provide a long strand fiberglass-impregnated waterproofing compound that may comprise a tar.

It is another objective of the present invention to provide a long strand fiberglass-impregnated waterproofing compound that may comprise a resin.

It is another objective of the present invention to provide a long strand fiberglass-impregnated waterproofing compound that may comprise a silicone.

It is another objective of the present invention to provide a long strand fiberglass-impregnated waterproofing compound that may comprise a two-part epoxy.

It is another objective of the present invention to provide a long strand fiberglass-impregnated waterproofing compound that may comprise a strengthening material.

It is another objective of the present invention to provide a long strand fiberglass-impregnated waterproofing compound that may comprise a structural lattice.

It is another objective of the present invention to provide a long strand fiberglass-impregnated waterproofing compound that may comprise a plurality of fiberglass strands.

It is another objective of the present invention to provide a long strand fiberglass-impregnated waterproofing compound that may comprise a plurality of long strand fiberglass.

It is another objective of the present invention to provide a long strand fiberglass-impregnated waterproofing compound that may comprise a pre-mixed waterproofing compound.

It is another objective of the present invention to provide a long strand fiberglass-impregnated waterproofing compound that may comprise a mobile storage container.

It is another objective of the present invention to provide a long strand fiberglass-impregnated waterproofing compound that may comprise a carriable storage container.

It is another objective of the present invention to provide a long strand fiberglass-impregnated waterproofing compound that may comprise a moisture-retaining container.

It is another objective of the present invention to provide a long strand fiberglass-impregnated waterproofing compound that may comprise an ultraviolet resistant container.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Figure 1:
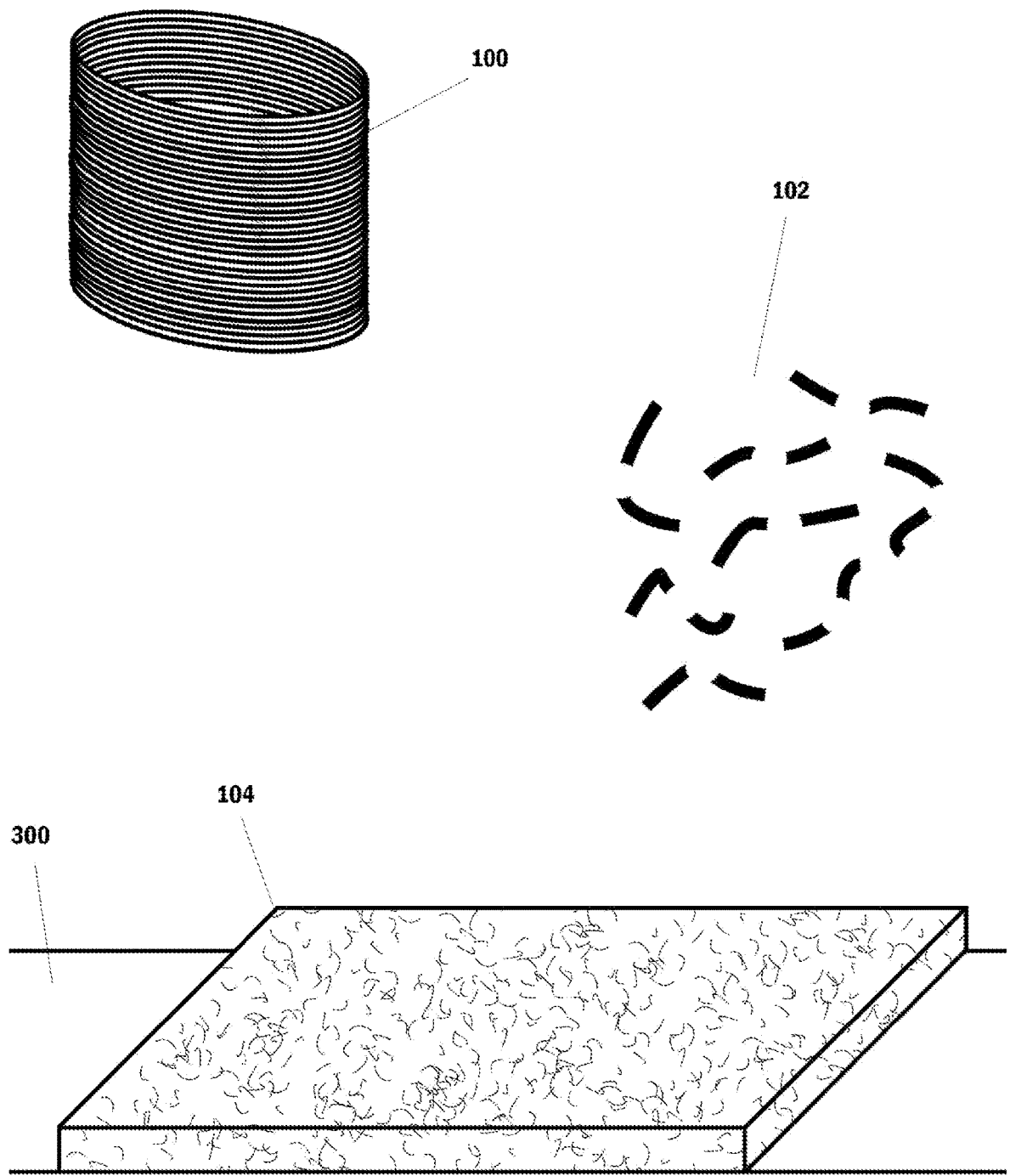
FIG. 1 is an overall view of a short strand fiberglass-impregnated waterproofing compound, as contemplated by the present disclosure.

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The long strand fiberglass-impregnated waterproofing compound may provide a pre-mixed waterproofing compound that eliminates the need for a worker to combine the various elements prior to application. The compound may benefit from the use of long strand fiberglass so as to provide additional strength and resiliency to the compound and may be provided in a container suitable for preventing the compound from drying out before it is applied. The advantages of such a compound include creating a seamless waterproof seal on a surface, as well as adding structural rigidity and strength to the surface, while reducing the amount of time needed to apply the compound. The compound comprises, generally, a waterproofing material combined with a structural lattice in a portable container.

The illustrations of FIGS. 1-4 illustrate a long strand fiberglass-impregnated waterproofing compound, as contemplated by the present disclosure. The compound may comprise, generally, a structural lattice 100 and a binder 200 that are pre-mixed and may be applied onto a surface. The structural lattice 100 is intended to provide a strengthening component to the compound, and is usually a fiberglass, though may be any appropriate material such as, for example, polyester, nylon, Kevlar, cotton, or other material. The binder 200 is intended to provide a waterproof primary component to the compound, and is usually asphalt, though may be any appropriate material such as, for example, tar, concrete, resin, silicone, two-part epoxy, or other material.

The long strand fiberglass-impregnated waterproofing compound is intended to be applied onto a working surface, such as a building roof or side wall, wherein the compound dries into a solid composition and the structural lattice 100 forms a three dimensional framework within the binder 200. The compound, thus, may further comprise a wetting agent that evaporates out of the compound allowing it to dry and solidify. Such a wetting agent may comprise any appropriate agent such as, for example, water, alcohol, or other similar agent.

The long strand fiberglass-impregnated waterproofing compound is intended to be applied by any appropriate mechanism known in the art such as, for example, by spreading the compound by hand, by placing the compound and then flattening it with a paint roller, or by spraying the compound from an appropriate sprayer device.

Although the long strand fiberglass-impregnated waterproofing compound is described as being used on roof or wall, it is to be understood that the present invention may be used to create a waterproofing surface on any structure. By way of example, the compound may by applied to a boat hull, a surfboard, an interior floor, or any other structure.

Figure 2:
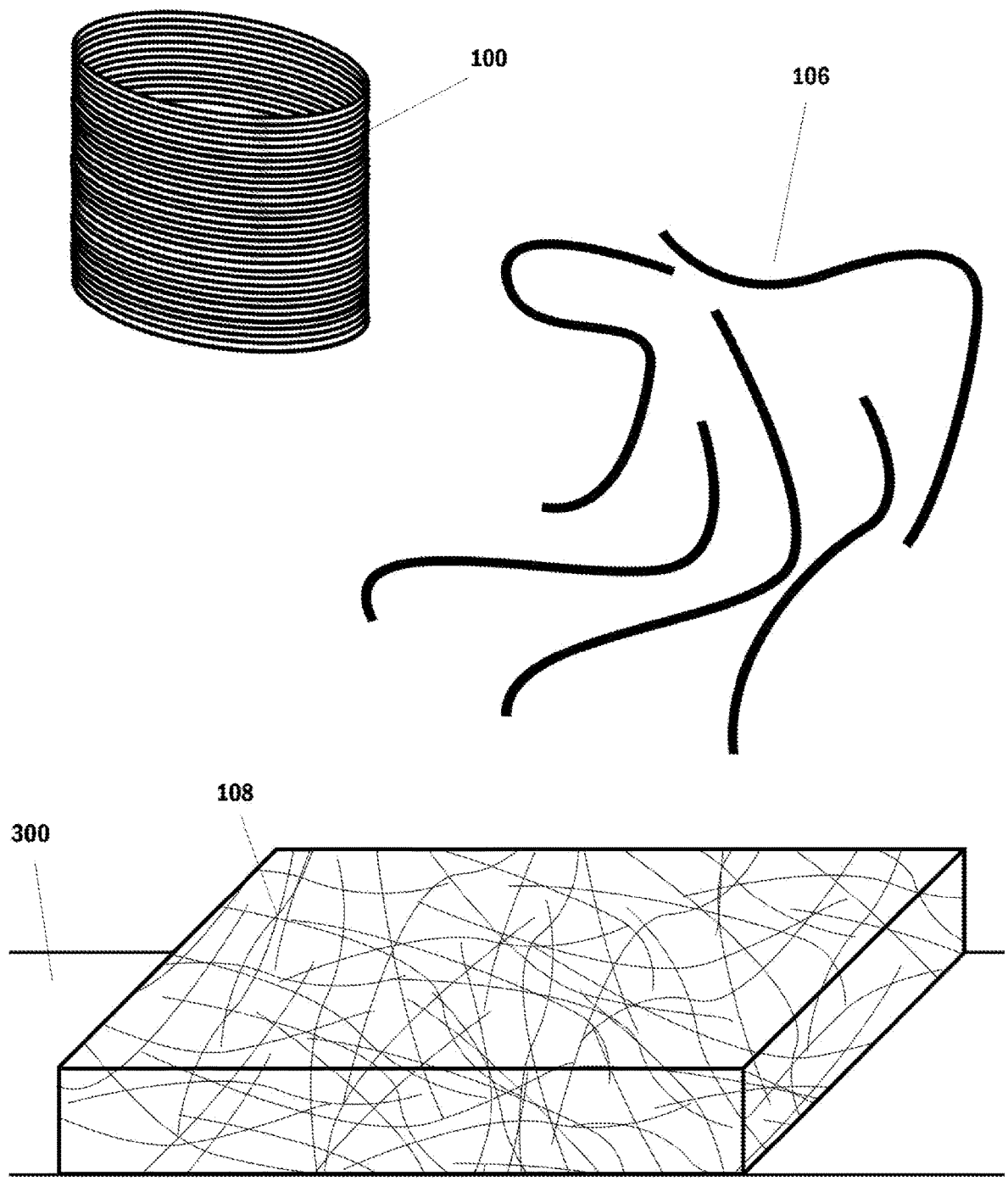
FIG. 2 is an overall view of a long strand fiberglass-impregnated waterproofing compound, as contemplated by the present disclosure.

The illustrations of FIGS. 1 and 2 illustrate embodiments of the present invention. The long strand fiberglass-impregnated waterproofing compound comprises a structural lattice 100 embedded in a binder 200. In one embodiment the structural lattice 100 may comprise short strand lattice 102 that may be all of the same or similar length and approximately three (3) inches long. It has been found that strands of such length will intertwine in an irregular pattern and increase the strength of the resulting composition. The compound may be applied to a surface 300 and may be smoothed out to form a first waterproof layer 104.

In another embodiment the structural lattice 100 may comprise long strand lattice 106 that may be all of the same or similar length and approximately twenty-four (24) inches long. It has been found that strands of such length will intertwine in an irregular pattern and more greatly increase the strength of the resulting composition than when using short strand lattice 102. The compound may be applied to a surface 300 and may be smoothed out to form a second waterproof layer 108.

In another embodiment, the structural lattice 100 may comprise both short strand lattice 102 and long strand lattice 106. It has been found that the combination of short strands mixed in with long strands provides a resulting compound that is much stronger than compositions found in the prior art.

Figure 3:
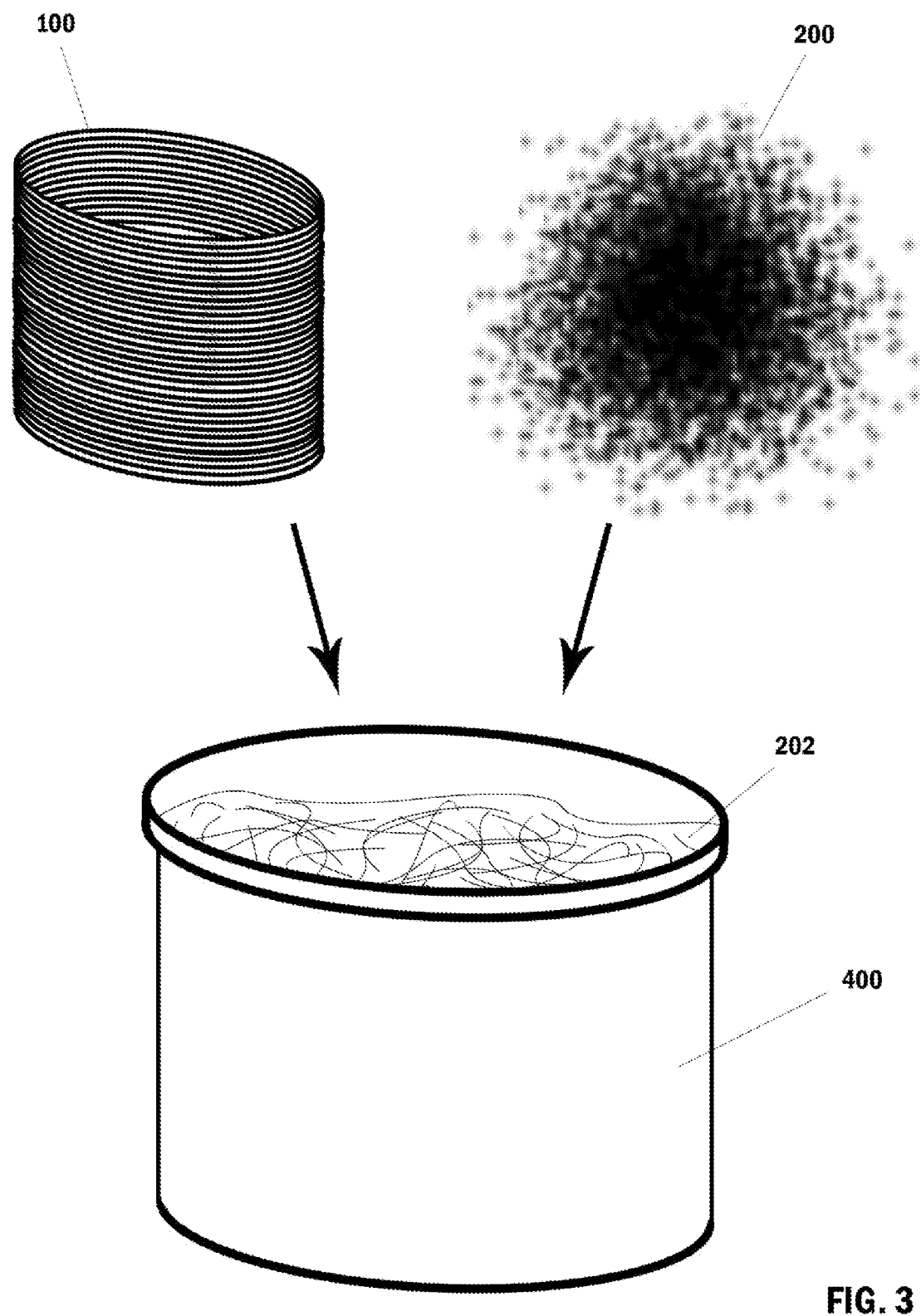
FIG. 3 is an overall view of the components of a long strand fiberglass-impregnated waterproofing compound, as contemplated by the present disclosure.

The illustration of FIG. 3 illustrates that a structural lattice 100 may be mixed with a binder 200 into viscous compound 202 and stored within a container 400. The viscous compound 202 may comprise a combination of water, asphalt, and clay. In one embodiment the emulsion is fifty percent (50%) water, forty-seven percent (47%) asphalt, and three percent (3%) clay by volume. The composition is produced by mechanical mixing and may comprise a ratio of eight (8) pounds of structural lattice 100 per fifteen (15) gallons of binder 200.

In one embodiment the compound may further comprise latex to increase the flexibility of the composition and make the resulting compound more resistant to water intrusion.

The addition of latex to the viscous compound 202 has not been found to trap water during the evaporation cycle of the compound.

In one embodiment the compound may further comprise a metal filling component such as, for example, aluminum, which may provide ultraviolet protection and a reflective surface that reduces the amount of solar heat absorbed by the resulting compound.

Figure 4:
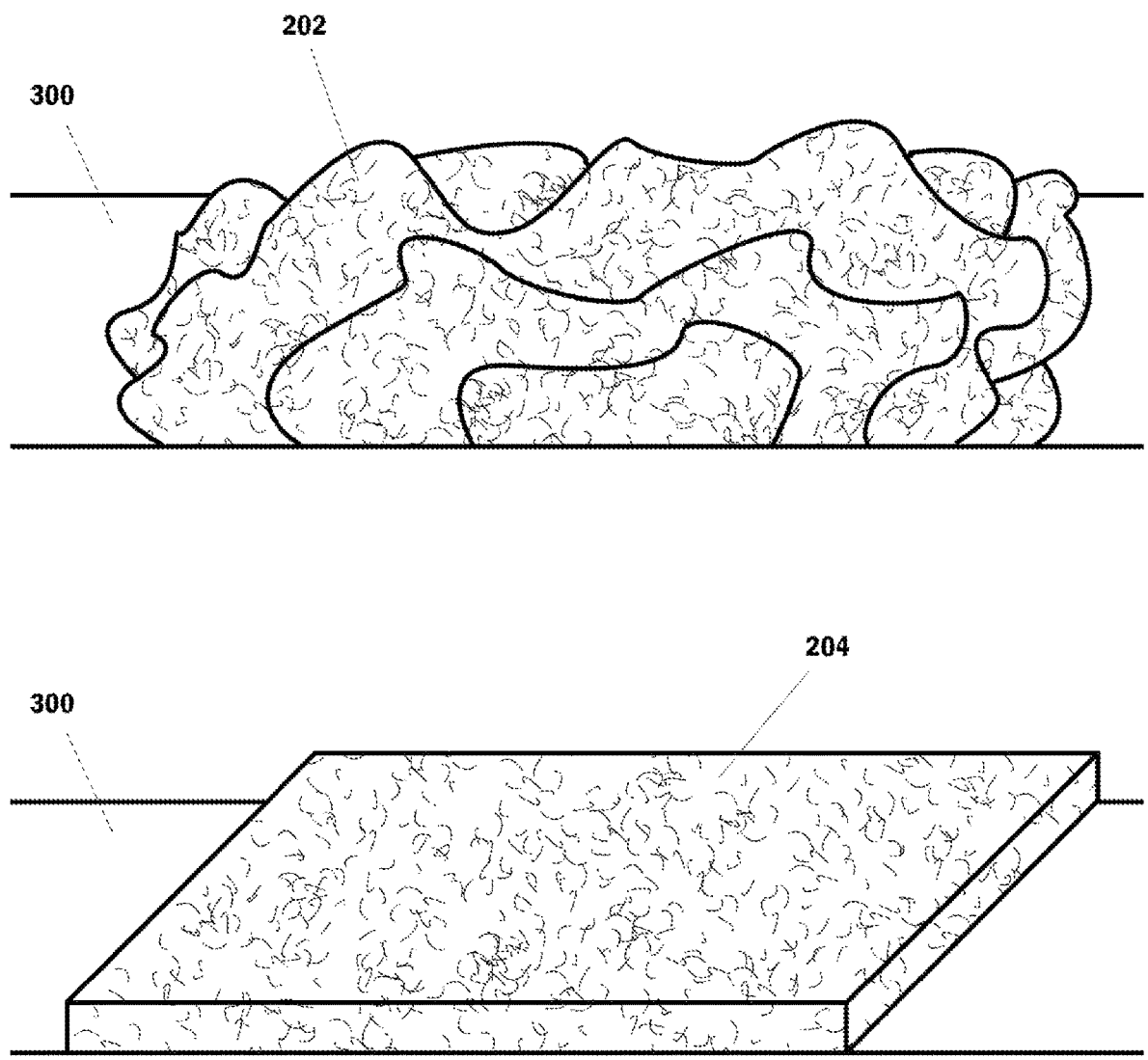
FIG. 4 is an overall view of the application of a long strand fiberglass-impregnated waterproofing compound, as contemplated by the present disclosure.

The illustration of FIG. 4 illustrates the application of the long strand fiberglass-impregnated waterproofing compound to a surface 300. The viscous compound 202 may first be removed from a container 400 and placed on a surface 300. The viscous compound 202 may then be spread by hand or by an appropriate tool such that it is evenly spread out with a thickness of approximately one-half (½) inch. Once spread, the viscous compound 202 may dry to a solid waterproof layer on the surface 300.

One or more layers of viscous compound 202 may be applied to the surface 300. In a multiple-layer application, different embodiments of the long strand fiberglass-impregnated waterproofing compound may be selected. By way of example, a first viscous compound 202 may comprise a latex additive for providing additional flexibility or waterproofing characteristics. A second viscous compound 202 applied on top of the first may comprise a metal additive for providing ultraviolet protection and left reflecting characteristics.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

We claim:

1. A long strand fiberglass-impregnated waterproofing compound, comprising:
    a binder;
    a structural lattice;
    a metallic additive;
    a wetting agent; and
    a container;
    wherein said binder, said structural lattice, and said wetting agent are combined into a viscous compound;
    wherein said viscous compound is stored within said container; and
    wherein said container prevents said viscous compound from drying out.

2. The invention of claim 1,
    wherein said structural lattice comprises a plurality of fiberglass strands.

3. The invention of claim 2,
    wherein said binder comprises an asphalt.

4. The invention of claim 3,
    wherein said wetting agent comprises a water.

5. The invention of claim 4,
    wherein said plurality of fiberglass strands are long strand fiberglass.

6. The invention of claim 5, further comprising:
    a flexible additive.

7. The invention of claim 6,
    wherein said flexible additive comprises a latex.

8. The invention of claim 5,
    wherein said metallic additive comprises an aluminum.

\* \* \* \* \*